US012518301B2

(12) United States Patent
Sheth et al.

(10) Patent No.: US 12,518,301 B2
(45) Date of Patent: *Jan. 6, 2026

(54) CONTENT COMPLIANCE SYSTEM

(71) Applicant: SPRINKLR, INC., New York, NY (US)

(72) Inventors: Devarsh Sheth, Gurgaon (IN); Yogin Patel, Gurgaon (IN); Anish Singhal, Haryana (IN); Vasant Srinivasan, Haryana (IN); Pavitar Singh, Haryana (IN)

(73) Assignee: SPRINKLR, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,580

(22) Filed: Jun. 9, 2023

(65) Prior Publication Data

US 2023/0325889 A1 Oct. 12, 2023

Related U.S. Application Data

(63) Continuation-in-part of application No. 16/431,668, filed on Jun. 4, 2019, now Pat. No. 11,715,134.

(51) Int. Cl.
*G06Q 30/02* (2023.01)
*G06N 20/00* (2019.01)
(Continued)

(52) U.S. Cl.
CPC ......... *G06Q 30/0276* (2013.01); *G06N 20/00* (2019.01); *G06Q 10/0637* (2013.01); *G06Q 30/0204* (2013.01); *G06Q 30/0269* (2013.01)

(58) Field of Classification Search
CPC ........... G06Q 30/0276; G06Q 10/0637; G06Q 30/0204; G06Q 30/0269; G06N 20/00
See application file for complete search history.

(56) References Cited

U.S. PATENT DOCUMENTS 6,078,924 A 6/2000 Ainsbury
7,720,835 B2 5/2010 Ward
(Continued)

FOREIGN PATENT DOCUMENTS

WO WO-2017062884 A1 * 4/2017 ........... G06F 17/248

OTHER PUBLICATIONS

Usability.gov, User Interface Elements, Jul. 8, 2013, https://web.archive.org/web/20130708215553/https:// www.usability.gov/how-to-and-tools/methods/user-interface-elements.html, pp. 1-6 (Year: 2013).*

(Continued)

*Primary Examiner* — John Van Bramer
(74) *Attorney, Agent, or Firm* — Schwabe Williamson & Wyatt

(57) ABSTRACT

A content compliance system uses machine learning to generate objective verification that content complies with brand criteria. The content compliance system may force the company to select specific brand criteria listed on a user interface. The selected brand criteria are then readily displayed to the creative agency. The content compliance system then compares the selected brand criteria with content generated by the creative agency. The content compliance system uses machine learning algorithms to generate a compliance score that provides a real-time objective indication of the compliance of the creative content with the selected brand criteria. The creative agency can then modify the creative content and receive a real-time updated compliance score.

18 Claims, 14 Drawing Sheets

(51) Int. Cl.
*G06Q 10/0637* (2023.01)
*G06Q 30/0204* (2023.01)
*G06Q 30/0241* (2023.01)
*G06Q 30/0251* (2023.01)

(56) References Cited

U.S. PATENT DOCUMENTS

| | | | |
|---|---|---|---|
| 7,877,345 B2 | 1/2011 | Nigram | |
| 9,105,036 B2 | 8/2015 | Mass | |
| 10,140,646 B2 | 11/2018 | Parveen | |
| 10,229,090 B2 | 3/2019 | Mosley | |
| 10,509,863 B1 | 12/2019 | Arfa | |
| 10,685,183 B1 | 6/2020 | Arfa | |
| 10,949,406 B1* | 3/2021 | Calvo | G06F 16/215 |
| 11,049,133 B1 | 6/2021 | Huang | |
| 2003/0236834 A1* | 12/2003 | Gottfried | G06Q 30/02 709/204 |
| 2004/0059736 A1 | 3/2004 | Willse | |
| 2006/0129446 A1 | 6/2006 | Ruhl | |
| 2007/0244888 A1 | 10/2007 | Chea | |
| 2007/0294281 A1 | 12/2007 | Ward | |
| 2008/0133488 A1 | 6/2008 | Bandaru | |
| 2008/0154883 A1 | 6/2008 | Chowdhury | |
| 2009/0164417 A1 | 6/2009 | Nigam | |
| 2009/0282019 A1 | 11/2009 | Galitsky | |
| 2009/0319342 A1 | 12/2009 | Shilman | |
| 2010/0094878 A1 | 4/2010 | Soroca | |
| 2010/0262454 A1 | 10/2010 | Sommer | |
| 2011/0145064 A1* | 6/2011 | Anderson | G06Q 30/02 705/14.66 |
| 2011/0258049 A1 | 10/2011 | Ramer | |
| 2012/0179752 A1 | 7/2012 | Mosley | |
| 2013/0290142 A1 | 10/2013 | Croes | |
| 2013/0304581 A1 | 11/2013 | Soroca | |
| 2015/0066803 A1 | 3/2015 | Aneja | |
| 2015/0262313 A1 | 9/2015 | Shah et al. | |
| 2016/0063093 A1 | 3/2016 | Boucher | |
| 2016/0117737 A1 | 4/2016 | Sinha | |
| 2016/0179959 A1 | 6/2016 | Mosley | |
| 2016/0189165 A1* | 6/2016 | Vivlamore | H04L 67/10 705/14.73 |
| 2016/0267377 A1 | 9/2016 | Pan | |
| 2017/0068648 A1 | 3/2017 | Parveen | |
| 2019/0043075 A1 | 2/2019 | Peysakhovich | |
| 2019/0115008 A1 | 4/2019 | Jiang et al. | |
| 2019/0317994 A1 | 10/2019 | Singh et al. | |
| 2019/0325626 A1* | 10/2019 | Tao | G06T 11/60 |
| 2020/0004825 A1 | 1/2020 | Pasternack et al. | |
| 2020/0167417 A1 | 5/2020 | Li et al. | |

OTHER PUBLICATIONS

Lexalytics, "Sentiment Analysis Explained", Feb. 16, 2019, https://web.archive.org/web/20190216125755/https://www.lexalytics.com/technology/sentiment-analysis, pp. 1-13 (Year: 2019).*

Redmon, et al., "YOLOv3: An Incremental Improvement", Dec. 23, 2018, University of Washington; URL: https://web.archive.org/web/20181223120043/https://pjreddie.com/media/files/papers/YOLOv3.pdf>; 6 pages.

Szegedy et al., "Rethinking the Inception Architecture for Computer Vision", Cornell University, Dec. 11, 2015; URL: https://arxiv.org/abs/1512.00567; 10 pages.

Wikipedia "Dependency Grammar", Dec. 28, 2018, URL: https://web.archive.org/web/20181228023401/https://en.wikipedia.org/wiki/Dependency_grammar; 8 pages.

Wikipedia "Big Five Personality Trains", Dec. 28, 2018; URL: https://web.archive.org/web/20181228053946/https://en.wikipedia.org/wiki/Big_Five_personality_traits>; 39 pages.

Wikipedia "Named-entity Recognition", Dec. 28, 2018; URL: https://web.archive.org/web/20181228221205/https://en.wikipedia.org/wiki/Named-entity_recognition; 6 pages.

Dong-Guk Shin, An expectation-driven response understanding paradigm, in IEEE Transactions on Knowledge and Data Engineering, vol. 6, No. 3, pp. 430-443, Jun. 1994, doi: 10.1109/69.334859 (1994).

Lexalytics, Sentiment Analysis Explainted, Feb. 16, 2019, https://web.archive.org/web/20190216125755/https://www.lexalytics.com/technology/sentiment-analysis, pp. 1-13 (2019).

* cited by examiner

108

108H
Brand Guidelines

Select brand
The logos and brand colors will be picked from the brands you'll select. You have complete freedom to edit them later.

[ AMCE X ] ⌄

200

Logo 202

[ACME logo image]

Placement 204
[ Top Right X ] ⌄

% are of logo on creation
0-10 %  ⌄

Aspect Ratio
3:1

Colors this logo can be used in

206 — ● Blue #4472C4   ● Dark Blue #1B4586   ● Dark Gray #434343   ⊕

⊕ Add logo variation

Typography 208

Aa
Verdana

⊕
Add Typeface

Brand Color

● Blue #4472C4   ● Dark Blue #1B4586   ● Dark Gray #434343   ⊕

☐ Analysis of your Facebook Post with your pre defined campaign guidelines

6/10 Compliance score with campaign guidelines ⓘ  
High Resonance with your audience ⓘ

186 — Key Objectives/ Goals — 108A
- ⊘ Establish Thought Leadership

188 — Audience — 108B — 112 — Hide Suggestive Phrases ∧
- ⊘ Millenials
- ⊗ Generation x Suggestions from owned and benchmarking data sorted by engagement rate
[ The future of running ] [ Redefining the way of life ] [ With research we have found ]

192 — Channels — 108F
- ⊗ Linkedin
- ⊗ Twitter

196 — Format — 108D
- ⊗ Long Form Text
- ⊗ Short Form Video
- ⊗ Animated Gifs 198 — Tone — 108G — View Suggestive Phrases ∨
- ⊘ Proud
- ⊗ Nostalgia
- ⊘ Encouragement 190 — Customer Journey Stages — 108E
- ⊘ Loyalty
- ⊗ Ownership 194 — Key Content Themes — 108C — View Suggestive Phrases ∨
- ⊗ Adventure
- ⊗ Collectivism
- ⊘ Health 210 — Brand Personality — 108I — View Suggestive Phrases ∨
- ⊘ High Openness
- ⊗ Low Conscientiousness
- ⊘ High Extraversion
- ⊗ High Agreeableness
- ⊘ Low Emotional Range

Creative Guidelines 108J

212 — Creative Type
○ Graphic/ Illustrations

214 — Objects
○ Shoe
○ Adults

126

216 — Activates
○ BASKETBALL

218 — Gender
○ MALE

220 — Scenes
⊗ Road

222 — Focal Point
○ People

CONTENT COMPLIANCE SYSTEM

RELATED APPLICATIONS

The present application is a continuation continuation in part application of U.S. patent application Ser. No. 16/431,668 filed on Jun. 4, 2019, now U.S. Pat. No. 11,715,134, issued on Aug. 1, 2023, which is incorporated by reference in its entirety.

BACKGROUND

A company, and the products or services sold by the company, may be referred to generally as a brand. The company/brand may use a creative agency which provides content for the brand's advertising campaign. The content may include text, images, and/or sounds.

The company may initially specify some general subjective goals for the campaign. For example, the campaign may have an overall objective and a general theme. The company also may want the campaign directed to a specific audience, such as millennials. The company may inform the creative agency of these general subjective goals.

The creative agency generates content based on these campaign goals. The company and creative agency then go through multiple iterations of modifying the content to conform with the campaign goals. During the review process, the company also may specify other campaign requirements and goals not previously communicated to the creative agency. This iterative process of reviewing and editing content is time consuming and expensive.

BRIEF DESCRIPTION OF THE DRAWINGS

FIG. 4-9 depict example brand directives displayed by the content compliance system.

FIG. 10-12 depict example compliance results generated by the content compliance system.

FIG. 13 depicts an example content scheduler provided by the content compliance system.

DETAILED DESCRIPTION

A content compliance system uses Artificial Intelligence (AI) to generate objective verification which checks if content complies with brand campaign criteria. The content compliance system may force the company to select specific brand criteria listed on a user interface. The selected brand criteria are then readily displayed to the creative agency.

The content compliance system then compares the selected brand criteria with content generated by the creative agency. The content compliance system uses AI algorithms to generate a compliance score that provides a real-time objective indication of the compliance of the creative content with the selected brand criteria. The creative agency can then modify the creative content and receive a real-time updated compliance score.

This machine learning based compliance system provides real-time objective feedback regarding brand criteria compliance that reduces the overall development time for what was previously thought to be a subjective content review process. Thus, brand campaigns can be launched in less time and less expensively.

Figure 1:
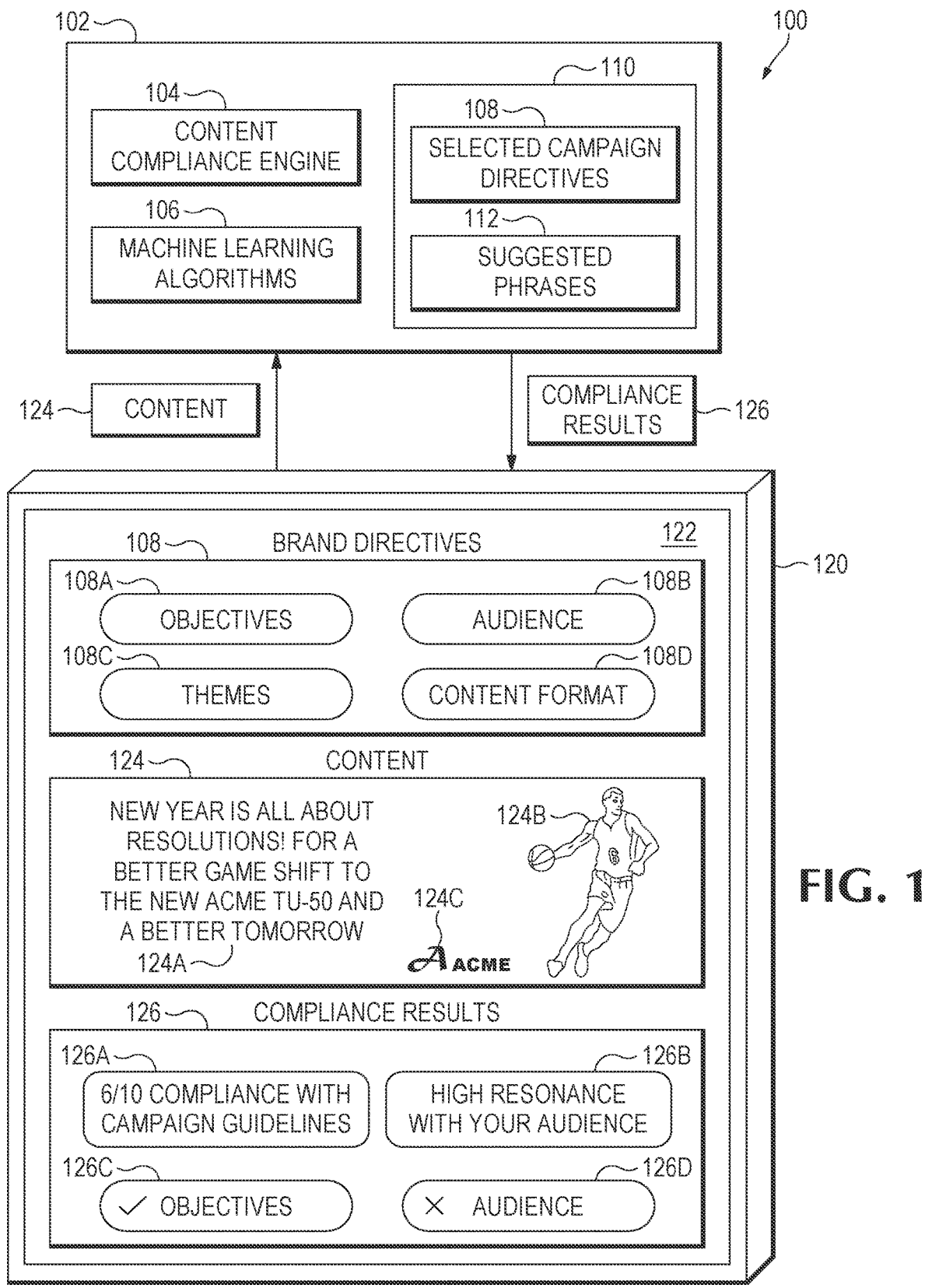
FIG. 1 depicts an example content compliance system.

FIG. 1 shows a content compliance system 100 that may include a content compliance engine 104 that operates a user interface 122 on a user computing device 120. In one example, content compliance system 100 may operate on a server computing system 102 also referred to as "the cloud". In this example, user computing device 120 may be a personal computer, laptop, tablet, smart phone, etc. that communicates with content compliance system 100 over the Internet. However, content compliance system 100 may be any software applications that operate on any computing system, and possibly on the same computing system as user computing device 120.

Content compliance engine 104 displays a list of brand directives 108 on user interface 122. For example, content compliance engine 104 may display a set of possible objectives 108A for the campaign, a set of possible audiences 108B for the campaign, a set of possible themes 108C for the campaign, and a content format 108D for the campaign. This is just an example set of brand directives 108 and additional brand directives are discussed in more detail below.

Compliance engine 104 may force the company/brand to select some combination of brand directives 108. This provides the advantage of forcing the company to clearly specify objective identifiable items for including in the campaign content. Content compliance engine 104 may store the selected brand directives 108 in a database 110.

The creative agency may access content compliance system 100. Compliance engine 104 may display a list of the previously selected brand directives 108 on user interface 122. The creative agency creates content 124 that tries to comply with selected brand directives 108. For example, the creative agency may create text 124A that communicates the selected objectives 108A and themes 108C in a manner that engages the selected audience 108B and uses the selected content format 108D. Content 124 may also include pictures, videos, images, etc. 124B and/or a company logo 124C that comply with content format 108D and any other selected brand directives 108.

Compliance engine 104 parses content 124 and compares the parsed content with selected brand directives 108. In one example, compliance engine 104 uses machine learning algorithms 106 and any other known natural language processing to identify different messages, phrases, subjects, images, tones, attributes, brands, sentiment, or any other content that may be associated with any of selected brand directives 108. Other known software programs can identify formatting used in content 124, such as different types, sizes, colors positions, actions, etc. of objects in content 124. Example software programs are described at https://arxiv.org/abs/1512.00567 and https://pjreddie.com/media/files/papers/YOLOv3.pdf which are incorporated by reference in their entireties and used for training task specific models.

Content compliance system 100 also may store a set of suggested phrases 112 for different types of brand directives 108. Suggested phrases 112 may have been used and tested in previous campaigns and determined to generate high engagement with different audiences and/or determined to be effective in achieving other brand directives 108. For example, a certain phrase "With research we have found" may have been determined through benchmarking to produce high engagement with millennials. Content compliance system 100 may store "With research we have found" as one of suggested phrases 112 associated with a millennials category in audience 108B.

In one example, compliance engine 104 may use suggested phrases 112 to determine compliance of content 124 with brand directives 108. For example, brand directives 108 may include millennials in audience 108B. Compliance engine 104 may use natural language processing to determine if any phrases in content 124 are similar to the suggested phrases 112 associated with millennials.

Content compliance engine 104 generates compliance results 126 based on the comparison of content 124 with selected brand directives 108. For example, as part of compliance results 126, compliance engine 104 may count and display a compliance score 126A that identifies the number of selected brand directives 108 contained in content 124.

Compliance results 126 also may include a resonance level 126B that indicates a high, medium, or low level of resonance of content 124 with the selected audience. Compliance engine 104 may generate resonance level 126B based on the similarity of phrases in content 124 with suggested phrases 112 associated with the selected audience. Other factors taken into account when determining the resonance level 126B may include objectives 108A, themes 108C, content format 108D, images 124B or any other brand directives 108 in content 124 that has been determined to generate user engagement.

As part of compliance results 126, compliance engine 104 may display individual compliance indicators 126C and 126D showing if particular brand directives 108 exist in content 124. For example, compliance indicator 126C shows that content 124 contains the objectives 108A selected in brand directives 108 and compliance indicator 126D shows that content 124 does not comply with audience 108B selected in brand directives 108.

As mentioned above, compliance results 126 can be generated by compliance engine 104 in real-time as soon as content 124 is generated. The creative agency can then use compliance results 126 to modify content 124 in real-time to increase compliance score 126A and resonance score 126B. The creative agency can also view individual compliance indicators 126C and 126D to determine what specific brand directives 108 are not currently included in content 124.

The creative agency may repeatedly modify and resubmit content 124 to compliance system 100 until compliance results 126 reach an acceptable compliance score 126A and resonance level 126B. In one example, compliance engine 104 may be programmed with compliance threshold scores, such as 90% compliance with all brand directives 108 and a high resonance level with viewers. Compliance engine 104 may automatically display a message on user interface 122 when content 124 reaches the acceptable compliance thresholds.

After reaching the acceptable compliance thresholds, the creative agency may submit content 124 to the brand for final approval or may publish content 124 on any identified media channels, such as posting content 124 on one or more social media websites. Thus, content compliance system 100 provides substantial time savings by reducing the number of iterations needed to produce content 124 that complies with brand directives 108.

Figure 2:
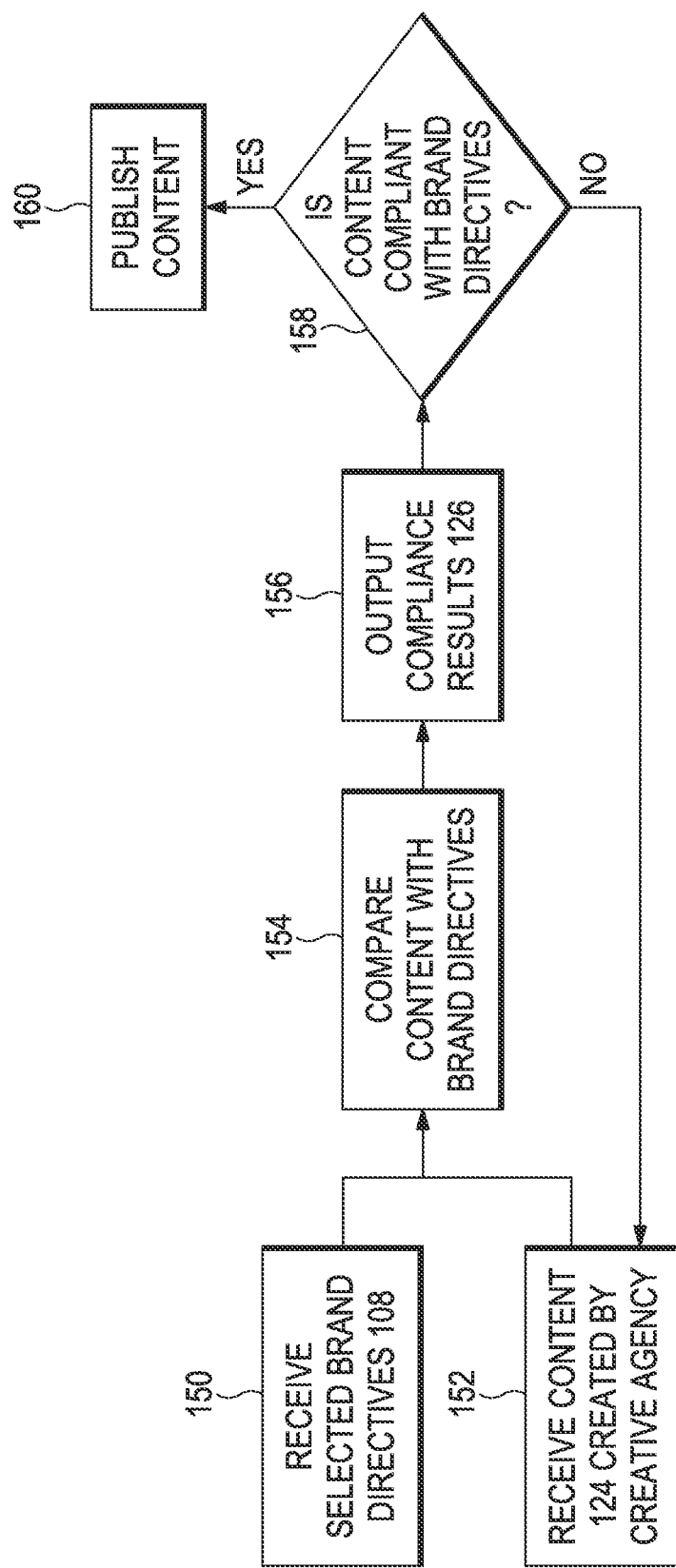
FIG. 2 depicts example operations performed by the content compliance system.

FIG. 2 shows an example process performed by content compliance system 100. In operation 150, content compliance system 100 receives brand directives 108 selected by the company/brand. As explained above, content compliance system 100 may display a list of brand directives 108 on a user interface that the company may select.

In operation 152, content compliance system 100 receives content 124 created by the creative agency. Compliance system 100 may display a summary of the selected brand directives 108 to the creative agency via the user interface. The creative agency then produces content 124 based on the displayed brand directives 108.

In operation 154, compliance system 100 compares content 124 produced by the creative agency with brand directives 108 selected by the company/brand. As explained above, known machine learning algorithms are used to determine if content 124 contains selected brand directives 108.

In operation 156, compliance system 100 outputs compliance results 126 based on comparisons 154 of content 124 with brand directives 108. As mentioned above, compliance system 100 may generate a compliance score 126A identifying the number of selected compliance directives 108 contained in the content 124, generate a resonance level 126B indicating how well content 124 will resonate with the viewing audience, and display compliance indicators 126C and 126D identifying which specific compliance directives 108 are contained in content 124.

In operation 158, compliance system 100 determines if content 124 is complaint with the brand directives. For example, compliance system 100 may determine if compliance score 126A and resonance level 126B is above particular threshold levels. If compliance results 126 are above the threshold numbers or percentages, compliance system 100 may publish the content in operation 160. For example, compliance system 100 may post content 124 on a social media network selected by the company/brand as one of brand directives 108. Alternatively, compliance system 100 may send content 124 to the company/brand for a final review prior to publishing in operation 160.

If not compliant with the brand directives 108 in operation 158, compliance system 100 may send content 124 back to the creative agency and/or notify the creative agency that content 124 requires further editing. The creative agency then edits content 124 in operation 152 and resubmits the edited content to compliance system 100 for another comparison with brand directives 108 in operation 154. This iterative automated review process repeats until content 124 meets a specified compliance level in operation 158.

Figure 3:
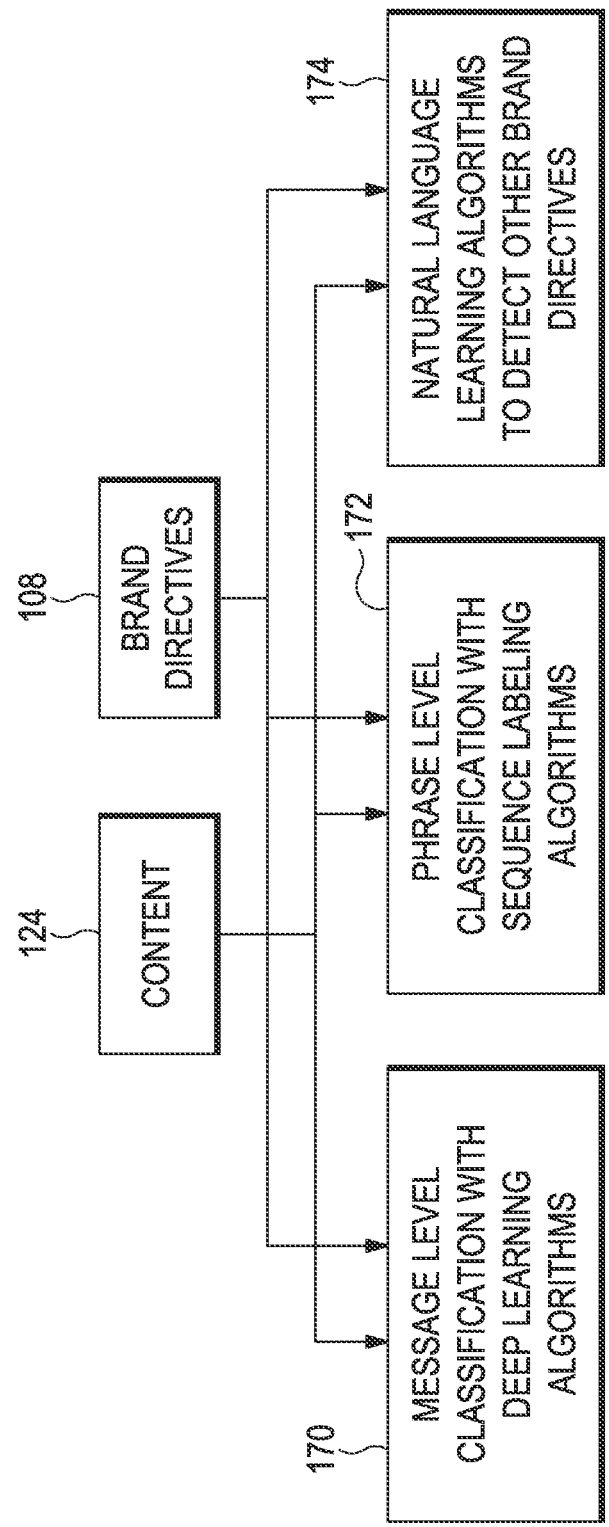
FIG. 3 depicts example algorithms used for comparing brand directives with content.

FIG. 3 shows in more detail how compliance system 100 compares content 124 with brand directives 108. A first set of deep learning algorithms 170 may classify content 124 on a message level and compare any identified messages in content 124 with brand directives 108. A second set of sequence labeling algorithms 172 may classify content 124 on a phrase level and compare any identified phrases in content 124 with brand directives 108. As mentioned above, compliance system 100 may use any other natural language learning algorithms 174 known to those to those skilled in the art to detect any other selected brand directives 108 in content 124.

Some example deep learning algorithms that perform message and phrase level classification are described in U.S. patent application Ser. No. 16/251,934; entitled: CONTENT INSIGHT SYSTEM; filed Jan. 18, 2019, which is herein incorporated by reference. Subjects 152A and attributes 152B identified in content in the above referenced application may be compared with selected brand directives 108. Compliance system 100 may identify any brand directives 108 matching any of the identified subjects 152A and attributes 152B in content 124.

Other example deep learning algorithms and sequence labeling algorithms for message and phrase level classification of content are described at https://en.wikipedia.org/wiki/Named-entity_recognition and at https://en.wikipedia.org/wiki/Dependency_grammar which are herein incorporated by reference in their entirety.

Deep learning algorithms may refer any machine learning algorithm with multiple non-linear layers that can learn feature hierarchies. Another example deep learning algorithm is word2vec that may generate multi-dimensional word vectors from content 124 and brand directives 108. Content vectors in the same multi-dimensional space location as brand directive vectors may indicate the brand directive 108 is contained in content 124.

Figure 4:
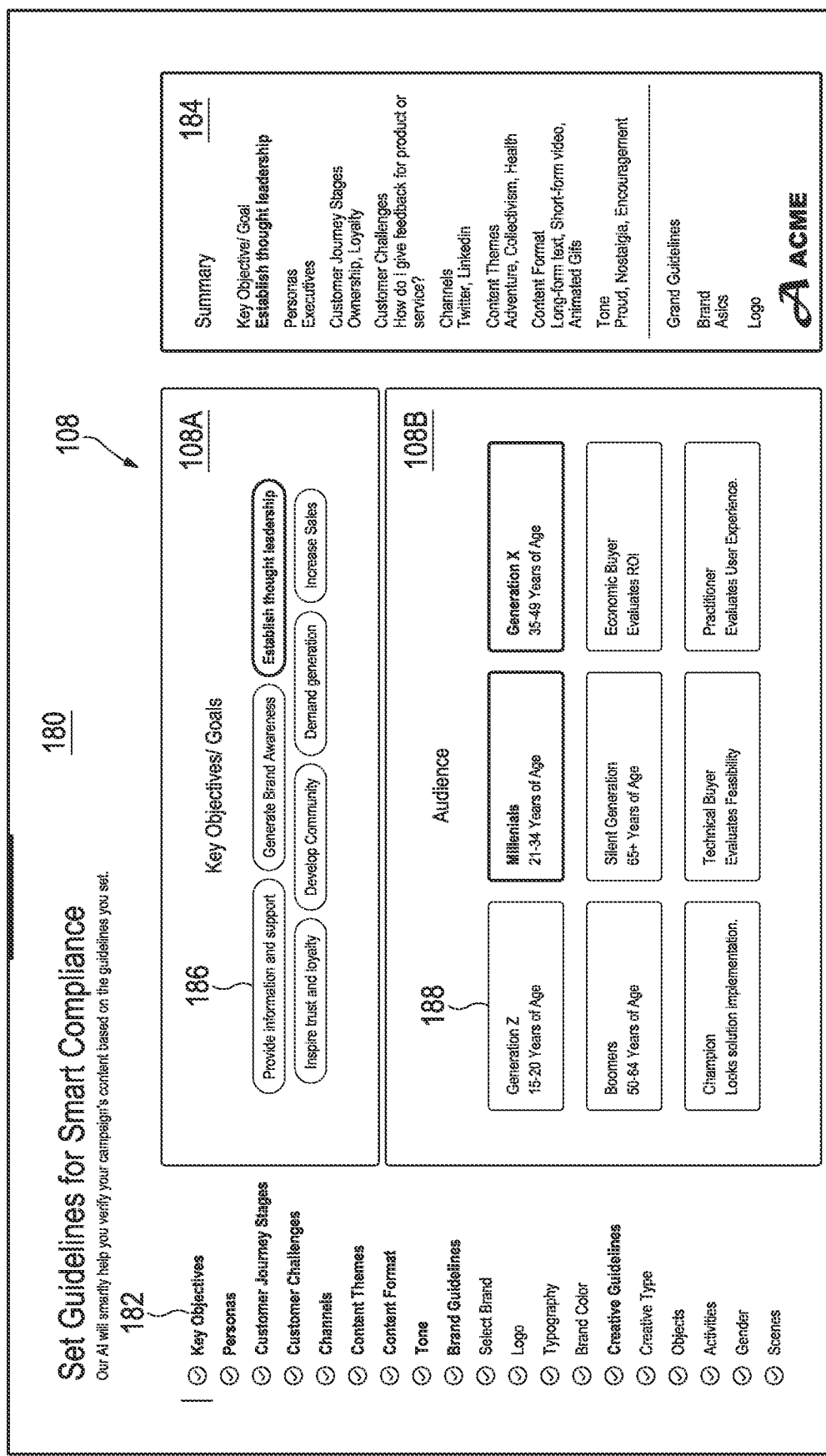

FIG. 4 shows in more detail user interface 122 operated by content compliance system 100. Compliance system 100 may display a guideline section 180 that the company/brand can use to select different brand directives 108. Guidelines section 180 may include a checklist 182 of which brand directives 108 have been selected. The company/brand can quickly view checklist 182 to determine which brand directives 108 still need to be selected. A summary section 184 identifies which specific brand directives 108 were selected by the company/brand. Brand directives 108 described below are just examples and any combination of any number of brand directives 108 may be used by compliance system 100.

As mentioned above, brand directive 108A may include different selectable objectives/goals 186. Example selectable objectives/goals 186 may include: provide information and support, generate brand awareness, establish though leadership, inspire trust and loyalty, develop community, demand generation, increase sales.

Brand directive 108B may include different selectable audiences 188 that include: generation Z, millennials, generation X, boomers, silent generation, economic buyer, champion, technical buyer, and practitioner. Generation Z may be between ages 15-20, millennials may be between ages 21-34, generation X may be between ages 35-49, boomers may be between ages 50-64, and silent generation may be over age 65. The economic buyer may evaluate a return on investment (ROI), a champion may be looking for implementation of a solution, a technical buyer may evaluate feasibility, and the practitioner may evaluate a user experience. Of course, all of these are just examples of any audience 188 where a brand may want to direct content.

Figure 5:
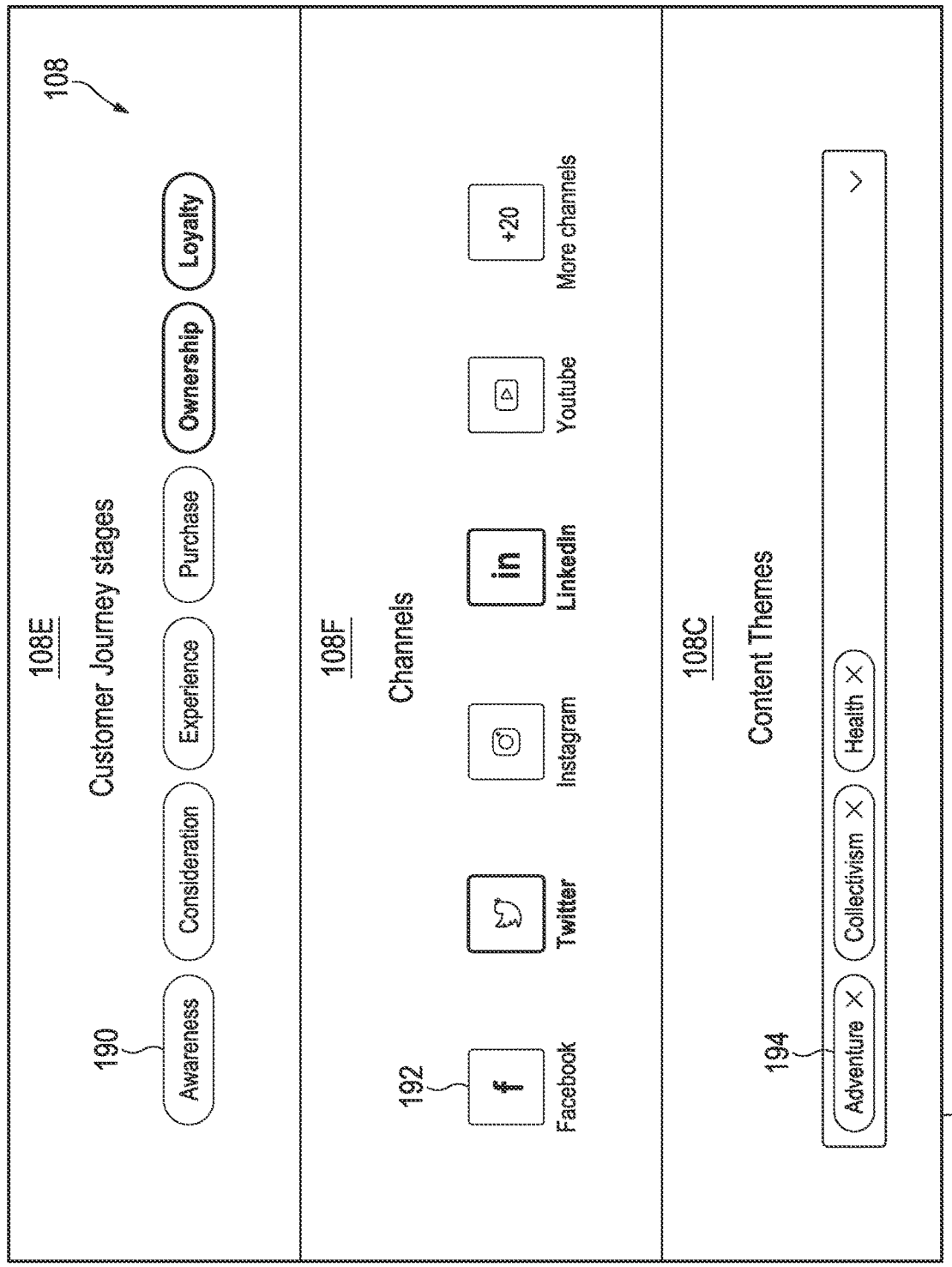

FIG. 5 shows additional selectable brand directives 108 that compliance system 100 may display on user interface 122. A brand directive 108E may identify selectable customer journey stages 190 for establishing with people viewing content 124 including: awareness, consideration, experience, purchase, ownership, and loyalty.

A brand directive 108F may identify different selectable channels 192 for publishing content 124 including social media platforms such as: Facebook®, Twitter®, Instagram®, LinkedIn®, YouTube®, etc.

A brand directive 108C, as mentioned above in FIG. 1, may identify different themes 194 for content 124 including: adventure, collectivism, health, etc.

Figure 6:
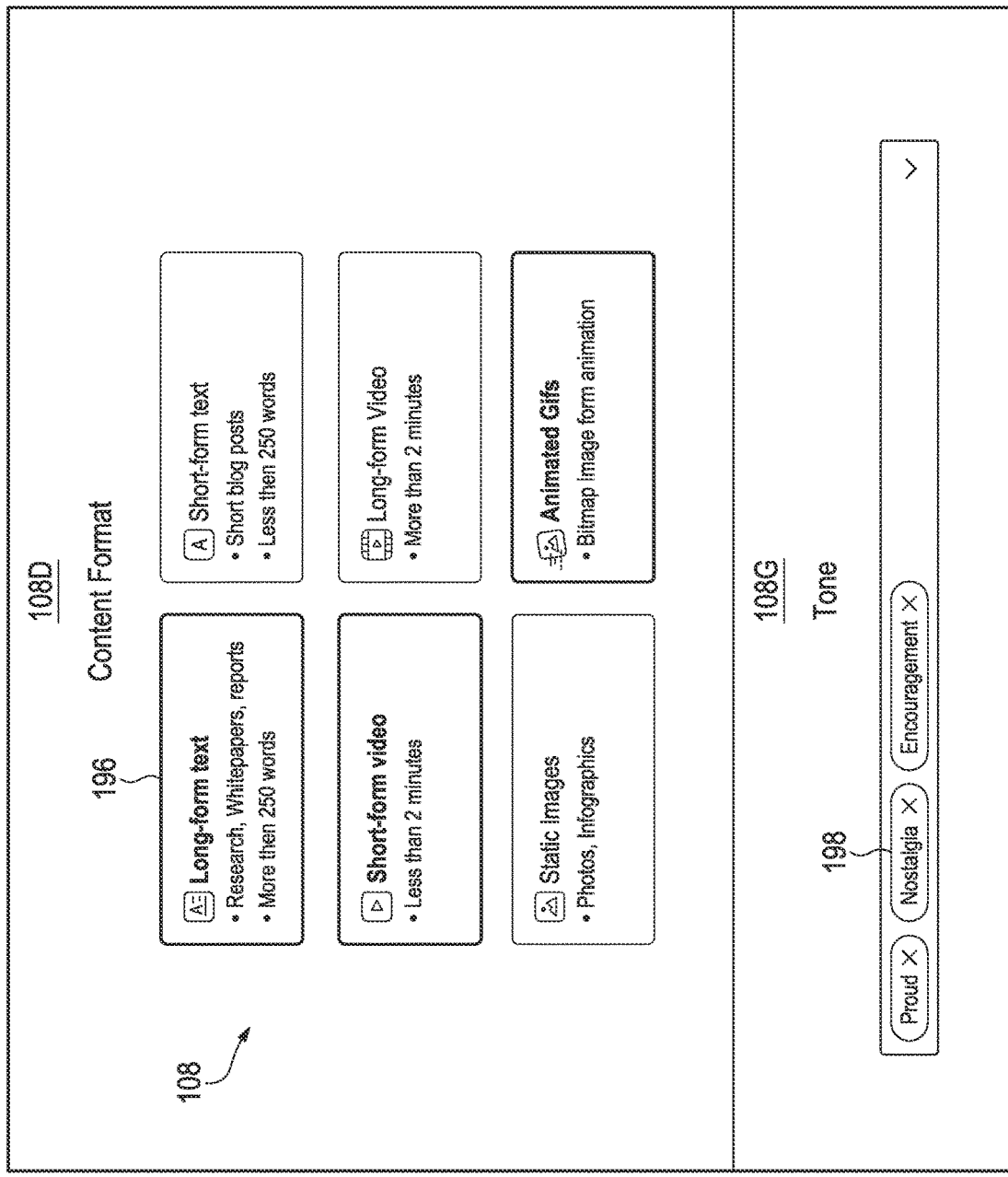

FIG. 6 shows additional selectable brand directives 108D and 108G that compliance system 100 may display on user interface 122. Brand directive 108D may identify different selectable formats 196 for content 124. A long-form text format 196 may include research papers, whitepapers, reports or any other documents over a certain number of words. A short-form text format 196 may include short blog posts, or any other text under a certain number of words. A short-form video format 196 may include videos less than a certain time length. A long-form video format 196 may include videos over a certain time length. A static images format 196 may include photos and infographics. An animated graphic interchange format (GIF) 196 may include bitmap images that form animation. Brand directive 108G may identify different tones 198 for content 124, such as proud, nostalgia, and encouragement.

FIG. 7 shows brand directives 108H for different selectable brand guidelines and formatting. For example, a first selectable brand guideline may be a brand name 200 to use in content 124. Other brand guidelines may select a particular logo 202 and location 204 for displaying brand logo 202 in content 124. Other brand guidelines may select a color 206 to use for logo 202 and a typography 208 and color 210 to use with brand name 200.

Figure 8:

FIG. 8 shows different selectable brand directives 108I associated with brand personalities 210. For example, brand personalities 210 may include openness 210A, conscientiousness 210B, extraversion 210C, agreeable 210D, and emotional range 210E. A selectable low openness 210A may be associated with inventive/curious and a selectable high openness 210A may be associated with consistent/cautious.

A selectable low conscientiousness 210B may be associated with efficient/organized and a selectable high conscientiousness 210B may be associated with easy-going/careless. A selectable low extraversion 210C may be associated with outgoing/energetic and a selectable high extraversion 210C may be associated with solitary/reserved. A selectable low agreeable 210D may be associated with friendly/compassionate and a selectable high agreeable 210D may be associated with challenging/detached. A selectable low emotional range 210E may be associated with sensitive/nervous and a selectable high emotional range 210E may be associated with secure/confident. More information about this can be found at https://en.wikipedia.org/wiki/Big_Five_personality_traits which is incorporated in its entirety.

Figure 9:
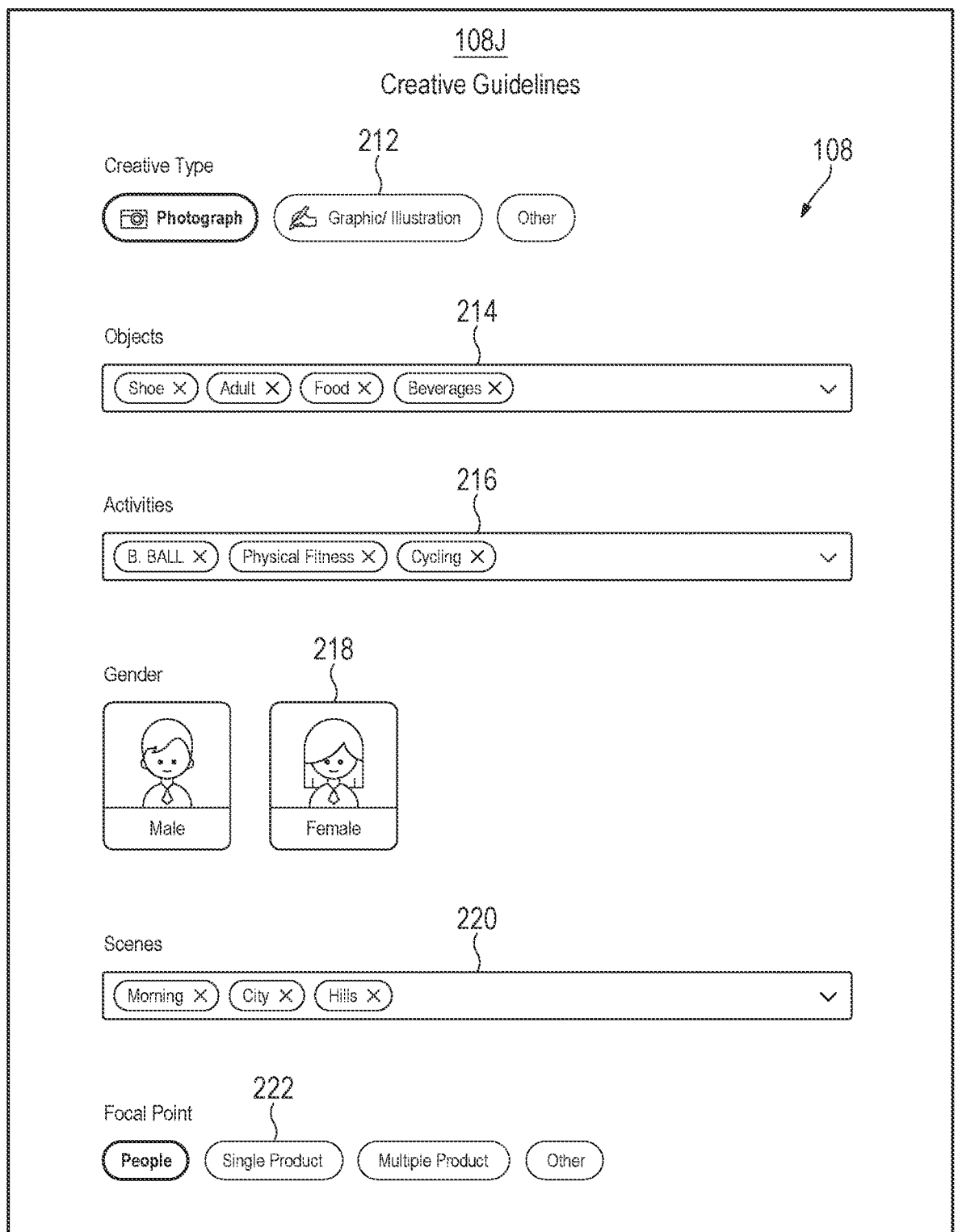

FIG. 9 shows selectable brand directives 108J associated with creative guidelines. Creative guidelines may include a creative type 212, objects 214, activities 216, a gender 218, scenes 220, and a focal point 222. Creative type 212 may include photographs, graphic/illustrations, or some other type of media. Objects 214 may include any object the company/brand would like to show in content 124, such as a shoe, adult, food, beverages, etc. Activities 216 to show in content 124 may include for example: basketball, physical fitness, cycling, etc. Gender 218 identifies the gender for a person for displaying in content 124. Scenes 220 may include any scene that should be displayed in content 124, such as a morning scene, city scene, hills scene, etc. Focal point 222 may identify a person, a single product, multiple products, or any other object that will serve as the focal point of content 124.

Figure 10:
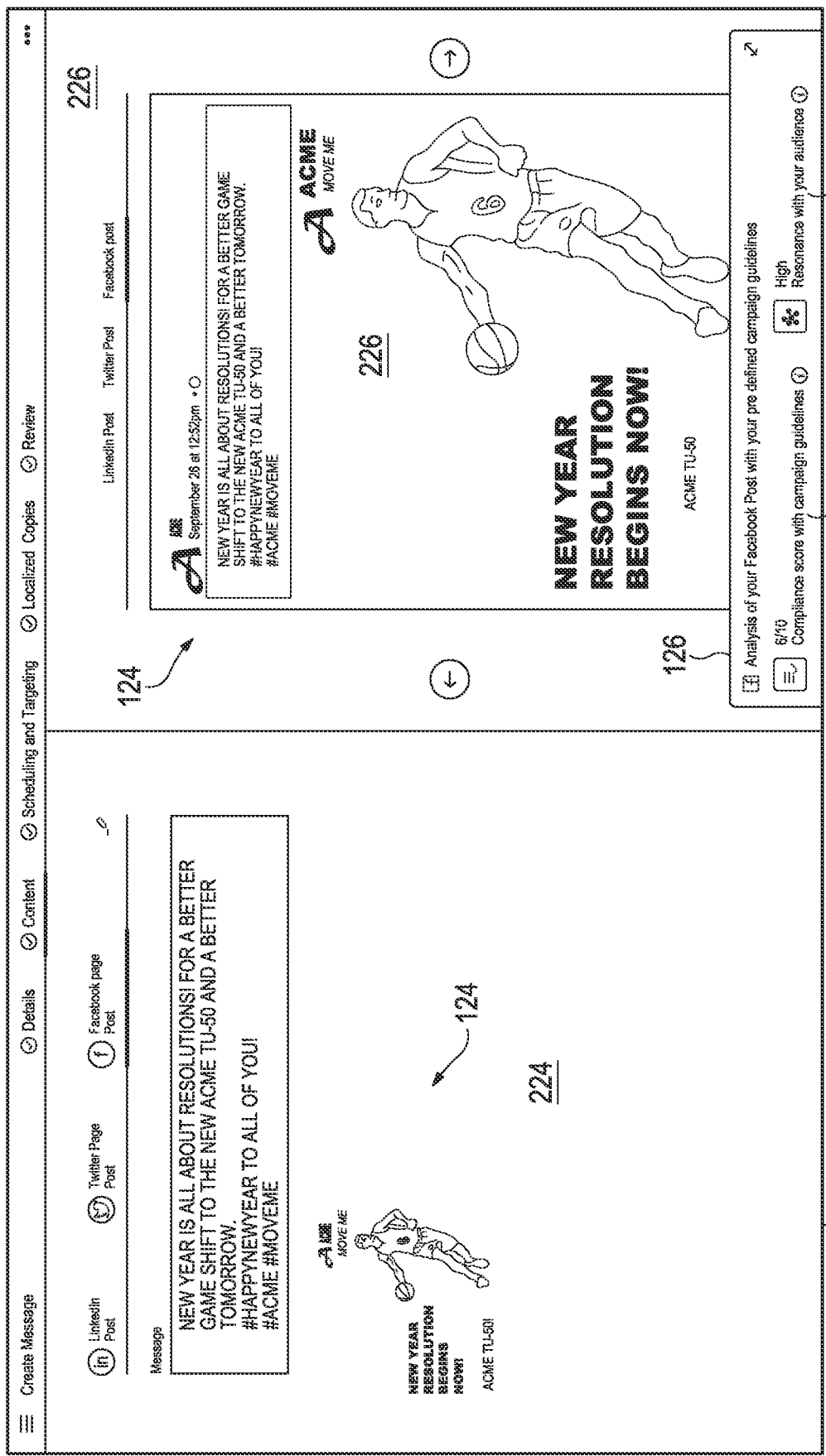

FIG. 10 shows a page 224 containing content 124 created by the creative agency based on the selected brand directives. As mentioned above, the creative agency has the advantage of viewing defined brand directives 108 when creating content 124.

FIG. 10 also shows a page 226 sent back from compliance engine 104 in FIG. 1 that includes compliance results 126 for content 124. In this example, compliance results 126 include compliance score 126A indicating 6 out of 10 selected brand directives 108 are contained in content 124. Compliance results 126 also include resonance sore 126B indicating a likelihood of high resonance/engagement of content 124 with the viewing audience.

FIGS. 11 and 12 show additional compliance results 126 for specific selected brand directives 108. Compliance system 100 may display all brand directives 108 selected by the company/brand on user interface 122.

Compliance system 100 may display a check mark or some other indicator when the selected brand directive 108 is identified in content 124. For example, user interface 122 shows that compliance system 100 detected identified thought leadership goal 186 in content 124. Compliance system 100 also determined content 124 was adequately directed to selected millennial audience 188 but was not adequately directed to generation X audience 188.

Compliance system 100 determined content 124 did not contain data needed for posting on selected LinkedIn® and Twitter® channels 192. Compliance results 126 also show that content 124 does not include selected long-form text, short-form video, and animated GIFs 196. Compliance results 126 may identify any other selected brand directive 108, such as tones 198, customer journey stages 190, and themes 194.

Compliance system 100 also may display suggestive phrases 112 for the different selected brand directives 108. As explained above, different phrases may be associated with different brand directives 108. For example, based on prior benchmarking, it may be discovered that particular phrases 112 may increase engagement with particular audiences or with all audiences.

Compliance system 100 may display suggestive phrases 112 with the associated brand directives 108. For example, compliance system 100 may determine current content 124 will not highly engage the generation X audience. Prior benchmarking may have determined suggestive phrases 112 in FIG. 11 provide high engagement rates with a generation X audience. The creative agency may add one or more suggestive phrases 112 into content 124 to increase generation X engagement. Compliance system 100 compares revised content 124 with selected brand directives 108 and may determine revised content 124 will more likely have an increased engagement rate with generation X audience 188.

FIG. 12 shows additional brand directives 108J selected by the company/brand, such as specific creative types 212, objects 214, activities 216, gender 218, scenes 220, and focal point 222. Compliance system 100 identifies which selected creative guideline directives 108J are contained in content 124. For example, compliance results 126 show that content 124 contains a graphic or illustration, shoes, an activity involved with basketball, and a male. Compliance results 126 also indicates that content 124 does not contain a road scene selected as one of brand directives 108J, but does contain people as a focal point.

Figure 13:
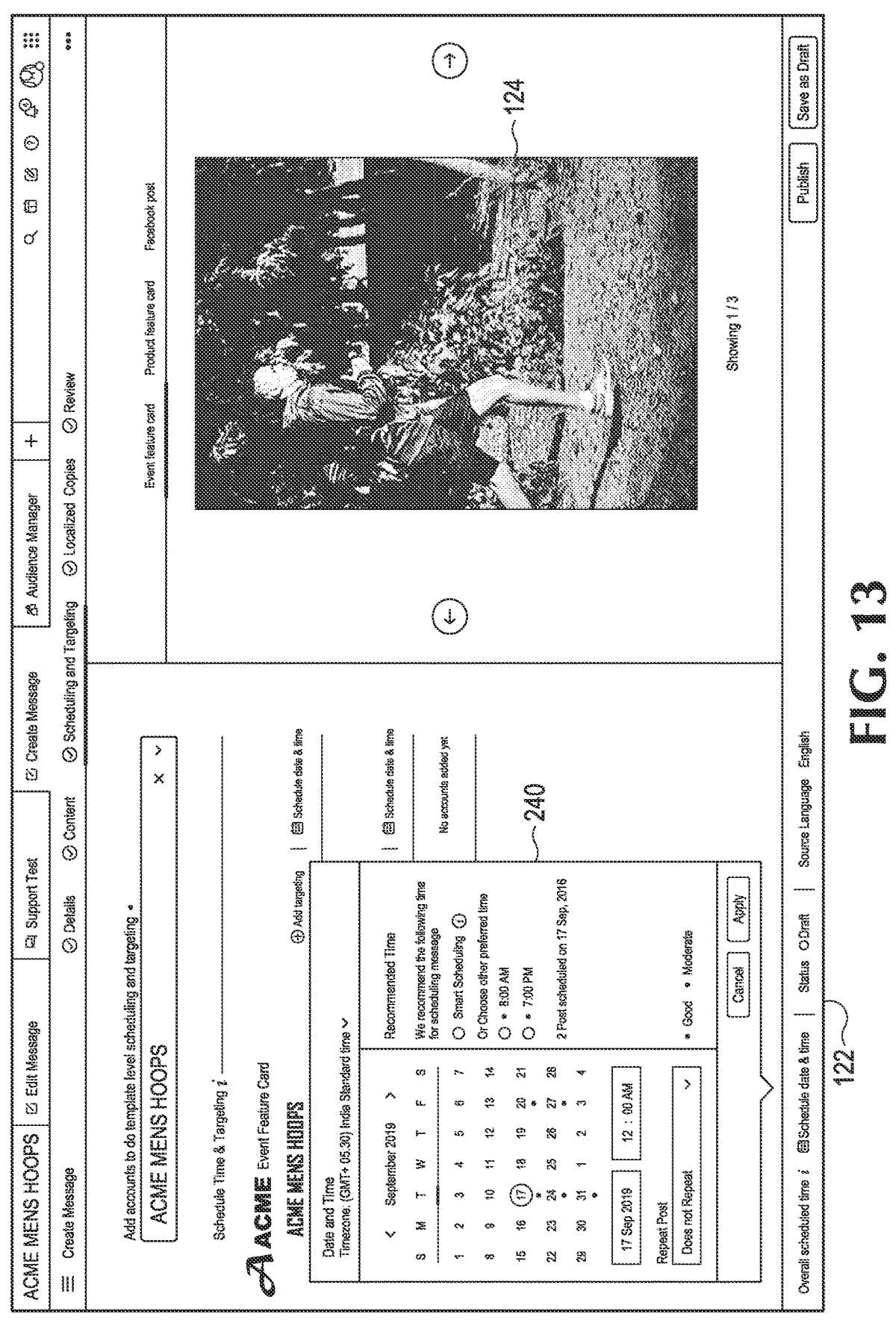

FIG. 13 shows a scheduling feature of compliance system 100. Compliance system 100 may display a calendar 240 on user interface 122. Either the company/brand or the creative agency may select what day and times to post content 124 on previously selected media channels 108F (FIG. 5). Compliance system 100 also may recommend days and times for posting content 124. For example, compliance system 100 may determine from previous benchmarking that more engagement with a selected audience, such as Millennials, increase on certain days or at certain times of the day. Compliance system 100 may identify the selected audience brand directive 108B and automatically post content 124 at the previously determined highest engagement times for the identified audience.

The content compliance engine 104 and scheme used for identifying compliance of content with selected campaign directives provides a substantial improvement in computer technology and operation by more efficiently processing and storing content in a database system in real time to then more quickly determine if and where specific data items are located in electronic documents.

Hardware and Software

Figure 14:
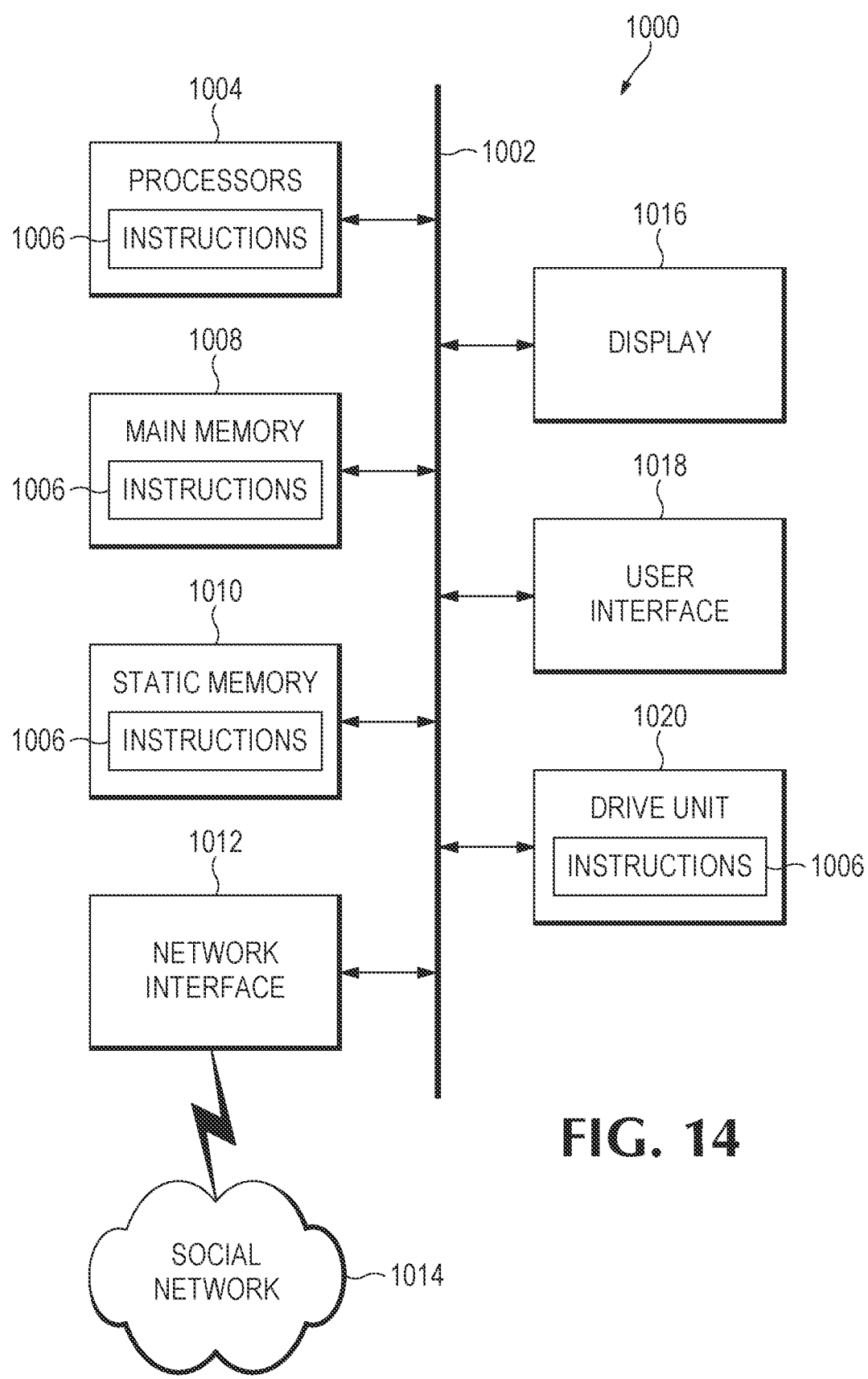
FIG. 14 depicts an example computer system used for implementing the content compliance system.

FIG. 14 shows a computing device 1000 that may be used for operating content compliance system 100 and performing any combination of operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the same corresponding time period.

The invention claimed is:

1. A system, comprising:
    at least one user terminal operatively connected to a hardware processor via a network;
    the at least one user terminal configured to:
        display selectable objectives for an advertising campaign on a user interface, the selectable objectives comprising a plurality of brand directives; and
        detect selection on the user interface of a plurality of selections from the displayed selectable objectives, the plurality of selections comprising selected brand directives;
    the hardware processor configured to, using a compliance engine and in response to identifying an input indicating the selected brand directives, analyze advertising campaign content with regard to the selected brand directives to determine which portion(s) of the content are in compliance with the selected brand directives and which portion(s) of the content are not in compliance with the selected brand directives;
    the hardware processor further configured to generate 1) compliance indicator(s) showing one(s) of the selected brand directives that do exist in the content and 2) non-compliance indicator(s) showing one(s) of the selected brand directives that do not exist in the content;
    the hardware processor further configured to generate, and display on a user interface at the at least one user terminal, a compliance visualization showing:
        individual indicators for each of the selected brand directives, wherein the individual indicators include a particular visual indicator for the compliance indicator(s), and wherein the individual indicators do not include said particular visual indicator for the non-compliance indicator(s);
        an aggregate compliance score based on a count of the selected brand directives, the aggregate compliance score further based on a count of the non-compliance indicator(s) or a count of the compliance indicator(s); and
        one or more user interface elements to access suggested content, the suggested content generated based on the content and the selected brand directives.

2. The system of claim 1, wherein the hardware processor is further configured to display a recommendation to publish at least a portion of the content when the compliance indicator(s) is not less than a threshold value.

3. The system of claim 1, wherein the suggested content includes suggestive phrases.

4. The system of claim 1, wherein the content comprises text data and non-text data.

5. The system s of claim 4, wherein the non-text data includes one or more images.

6. The system of claim 1, wherein the selected brand directives are selected from a set of selectable brand directives, wherein the set of selectable brand directives include campaign goals, a campaign audience, customer journey stages, content themes, or a tone for the content.

7. The system of claim 1, wherein the selected brand directives are selected from a set of selectable brand directives, wherein the set of selectable brand directives include a content format or campaign media channels for publishing at least a portion of the content.

8. The system of claim 1, wherein the selected brand directives are selected from a set of selectable brand directives, wherein the set of selectable brand directives include a logo used in the content, a placement location of the logo in the content, a percentage of the content that includes the logo, or colors of the logo used in the content.

9. The system of claim 1, wherein the selected brand directives are selected from a set of selectable brand directives, wherein the set of selectable brand directives include types of photographs or illustrations to use in the content, objects to use in the content, an audience to show in the content, scenes to show in the content, or objects to show as focal points in the content.

10. The system of claim 1, wherein the selected brand directives are selected from a set of selectable brand directives, wherein the set of selectable brand directives indicate formatting guidelines for the advertising campaign, and wherein the hardware processor is further configured to:
    identify types of formatting used in the content; and
    indicate on the user interface if the content is in accordance with the indicated formatting guidelines.

11. The system of claim 1, wherein the selected brand directives are selected from a set of selectable brand directives, wherein the set of selectable brand directives indicate types of images, objects, activities, and scenes for the campaign, and wherein the hardware processor is further configured to:
    identify images, objects, activities, and scenes in the content; and
    indicate on the user interface if the content is in accordance with the indicated images, objects, activities, and scenes.

12. The system of claim 1, wherein the selected brand directives are selected from a set of selectable brand directives, wherein the set of selectable brand directives identify one of the one or more selected brand directives indicating a type of audience, and wherein the hardware processor is further configured to:
  generate a resonance score indicating how the content resonates with the indicated audience; and
  display the resonance score on the user interface.

13. The system of claim 1, wherein the hardware processor is further configured to display different lists of suggested phrases on the user interface associated with different ones of the selected brand directives.

14. The system of claim 1, wherein the selected brand directives are selected from a set of selectable brand directives, wherein the set of selectable brand directives indicate a media channel for displaying the received content, and wherein the hardware processor is further configured to:
  automatically identify a time for publishing at least a portion of the content based on the selected brand directives; and
  automatically display the portion of the content on the indicated media channel at the identified time.

15. The system of claim 1, wherein the hardware processor is further configured to:
  determine which of the selected brand directives are represented by the content; and
  indicate in the list which of the selected brand directives are represented by the content.

16. A method, comprising:
  providing a user interface on at least one user terminal operatively connected to a hardware processor via a network;
  displaying on the user interface different selectable brand directives for including in a campaign, the brand directives including a goal, audience, tone, and format for content used in the campaign;
  detecting selection on the user interface of a plurality of selections from the displayed selectable objectives, the plurality of selections comprising selected brand directives; and
  receiving content for the campaign;
  using a compliance engine operated by the hardware processor to:
    generate non-compliance data indicating one or more parts of the received content do not comply with the selected brand directives, wherein the non-compliance data is determined based on a threshold;
    generate compliance data indicating one or more parts of the received content comply with the selected brand directives, wherein the compliance data is determined based on the threshold;
    derive, in response to the non-compliance data, at least one set of suggested content based on the received content and each of the selected brand directives associated with the non-compliance data; and
    generate and display on the user interface, a compliance visualization showing:
      individual indicators for each of the selected brand directives, wherein the individual compliance indicators include a particular visual indicator for the brand directives associated with the non-compliance data, and wherein the individual indicators do not include said particular visual indicator for the selected brand directives associated with the compliance data;
      an aggregate compliance score based on a count of the selected brand directives and at least one of:
        a count of the selected brand directives associated with the non-compliance data, or
        a count of the selected brand directives associated with the compliance data; and
      one or more user interface elements to access corresponding suggested content of the derived at least one set of suggested content.

17. The method of claim 16, further comprising:
displaying a recommendation to publish at least a portion of the received content when the count of the one or more selected brand directives associated with the compliance data is not less than a threshold value; or
automatically publishing the portion of the received content when the count of the one or more selected brand directives associated with the compliance data is not less than a threshold value.

18. The method of claim 17, wherein the derived one or more sets of suggested content include suggestive phrases.

* * * * *